United States Patent
Buchholz et al.

(10) Patent No.: US 7,860,888 B2
(45) Date of Patent: Dec. 28, 2010

(54) AUTHORIZATION DATA MODEL

(75) Inventors: Cristina Buchholz, Rellingen (DE); Frank Buchholz, Wiesloch (DE)

(73) Assignee: SAP AG, Walldorf (DE)

( * ) Notice: Subject to any disclaimer, the term of this patent is extended or adjusted under 35 U.S.C. 154(b) by 343 days.

(21) Appl. No.: 12/013,534

(22) Filed: Jan. 14, 2008

(65) Prior Publication Data

US 2008/0114769 A1    May 15, 2008

Related U.S. Application Data

(62) Division of application No. 10/447,680, filed on May 28, 2003, now Pat. No. 7,343,628.

(51) Int. Cl.
*G06F 7/00* (2006.01)
(52) U.S. Cl. .................................. 707/783; 726/28
(58) Field of Classification Search .......... 707/999.009, 707/694, 781–786
See application file for complete search history.

(56) References Cited

U.S. PATENT DOCUMENTS

| | | | |
|---|---|---|---|
| 6,236,996 B1 | 5/2001 | Bapat et al. | |
| 6,308,274 B1 | 10/2001 | Swift | |
| 6,466,932 B1 | 10/2002 | Dennis et al. | |
| 7,107,610 B2 * | 9/2006 | Lortz | 726/4 |
| 2001/0047485 A1 | 11/2001 | Brown et al. | |
| 2002/0083059 A1 | 6/2002 | Hoffman et al. | |
| 2002/0108057 A1 | 8/2002 | Zhanhong Wu et al. | |
| 2003/0023874 A1 | 1/2003 | Prokupets et al. | |
| 2003/0055704 A1 | 3/2003 | Reece | |
| 2003/0074580 A1 | 4/2003 | Knouse et al. | |
| 2003/0088786 A1 | 5/2003 | Moran et al. | |
| 2003/0200467 A1 | 10/2003 | Choy et al. | |
| 2004/0088560 A1 | 5/2004 | Danks | |
| 2004/0216150 A1 * | 10/2004 | Scheifler et al. | 719/330 |
| 2006/0230281 A1 | 10/2006 | Hofmann | |

FOREIGN PATENT DOCUMENTS

EP    0 697 662 A1    2/1996

OTHER PUBLICATIONS

Ravi S. Sandhu and Pierangela Samarati, "Access Control: Principles and Practice", 2460 IEEE Communications Magazine, 32 Sep. 1994, No. 9, New York, US, XP000476554, p. 40-49 (9pgs.).

(Continued)

*Primary Examiner*—Khanh B Pham
*Assistant Examiner*—Amy Ng
(74) *Attorney, Agent, or Firm*—Buckley, Maschoff & Talwalkar LLC (57) ABSTRACT

An authorization data model factors roles into generic roles and responsibilities, using these attributes at run-time to complete an authorization process based on non-static privileges associated with currently defined roles and responsibilities. Multiple applications collect current variable authorization information at run-time, when prompted by a user request to access a protected resource, from an external central repository that maintains updated generic role and responsibility information independent of user identity, thus replacing a fixed authorization structure with a flexible wild-card based model.

11 Claims, 4 Drawing Sheets

OTHER PUBLICATIONS

"PCT International Search Report and the Written Opinion of the International Searching Authority, or the Declaration", mailed Sep. 30, 2004, for PCT/EP2004/005750, 14pgs.

Cristina Buchholz et al., U.S. Appl. No. 10/447,680, entitled "Authorization Data Model" filed May 28, 2003, Office Action—Restriction Requirement, mailed Oct. 2, 2006.

Cristina Buchholz et al., U.S. Appl. No. 10/447,680, entitled "Authorization Data Model" filed May 28, 2003 Non-Final Office Action, mailed Dec. 18, 2006.

Cristina Buchholz et al., U.S. Appl. No. 10/447,680, entitled "Authorization Data Model" filed May 28, 2003, Final Office Action, mailed Sep. 14, 2007.

* cited by examiner

| Use | Role | Object | Action | Value |

AUTHORIZATION DATA MODEL

CROSS-REFERENCE TO RELATED APPLICATIONS

This is a divisional of co-pending U.S. patent application Ser. No. 10/447,680, filed May 28, 2003.

The present application is related to an application entitled "An Authorization Mechanism," filed in the U.S. Patent & Trademark Office by Cristina Buchholz on Feb. 21, 2003, Ser. No. 10/372,030, which application in its entirety is incorporated by reference herein.

TECHNICAL FIELD

This invention relates to information technology security sometimes referred to as e-security, and more particularly to authorization management within the context of information technology.

BACKGROUND

The working environment of e-business is characterized by open networks and cross-company business transactions, replacing closed, monolithic systems with intrinsic security mechanisms. In the world of Web services in eCommerce, access will depend more and more on authorization. In this environment, ways of rationalizing the authorization process and authorization status will be key.

Existing solutions for authorization management share a common constraint: they are all tailored to particular applications. Consequently, every time a new application is introduced into the corporate landscape, the user management tool has to create yet another adaptor for it. In most cases, the connection to a central user management tool also requires a plug-in to be installed in the software in order to accomplish the connection. While the user and current role information is centrally kept, because the information has to be prepared by and immediately available to each connected system, there is likely to be redundant storage. For example, where the same users have essentially the same roles and authorizations on different systems, the same user information may wind up being stored separately for multiple systems.

The amount of user information that must be handled is further exacerbated by the need to define and maintain separate roles for each distinct position within the organization, each distinct role being understood as a specific collection of privileges associated with a particular position. While user administration can rely on these roles for administering access rights, the advantages realized by the use of roles, in terms of easier inclusion of new users and grouping of function-related authorizations, are overridden by the huge number of roles to be maintained for even a medium-sized organization. Merely creating derived roles does not solve this problem of proliferation. In the case where the individual's actual role is merely a qualified version of a higher order role, the derived or qualified role merely gives rise to still another discretely defined role associated on an ad hoc basis with a specific privilege set for a specific position. Derived roles thus do not avoid proliferating data to be analyzed and maintained by the user management tools.

SUMMARY

The invention is based on an authorization data model that uses generic roles and, if applicable, responsibilities at run-time to complete an authorization process based on non-static privileges associated with the currently defined roles and responsibilities associated with a given user. In one aspect of the invention, when prompted by a user request to access a protected resource, such as a data file, via an application, the application collects information at run-time about the user's currently defined role, e.g., sales manager, and privileges associated with that role, dynamically decides whether the user is authorized to access a given protected resource based on the current variable role-based information, rather than the user's identity, collected at run-time. In a preferred system, the collection of this authorization information is accomplished by querying a central authorization data repository external to the application. The central authorization repository preferably stores and maintains dynamically variable role data defining generic roles that can be associated with multiple users and assigns users to said generic roles, more than one user being assignable to a given role. The role data can be altered from time to time to change a definition of a given role independently of user associations, and preferably independently of the respective responsibilities of users associated with a given generic role or responsibility. The repository associates privileges with said roles based on their current respective definitions. The information collected from said repository by the application includes the current variable value of the privilege status, with respect to the sought-after protected resource or type of resource, associated with the currently defined role assigned to the user requesting access.

In addition to roles, the repository can store and maintain generic responsibilities, e.g., sales territory, in the same manner described for roles, the responsibilities being variable, independently of the roles and users, and assignable to multiple users.

In the preferred system, the users are assigned to roles and responsibilities by decomposing a given user's positional functions and responsibilities into basic actions and objects to which the actions are applied, mapping the actions and objects onto respective generic roles and responsibilities stored in said repository, and assigning the respective roles and responsibilities to the user.

In another aspect of the invention, multiple applications collect current, variable authorization information at run-time from an external central repository that maintains updated generic role and, if applicable, generic responsibility information independent of user identity, thus replacing a fixed authorization structure with a flexible wild-card based model. Upon receiving requests for authorization at a plurality of applications from users seeking access to protected resources, the applications independently collect respective authorization information at run-time from a central repository containing user information, the user information including non-static roles whose definitions and corresponding privileges are variable, independently of the users associated with said roles. The applications base decisions on access to protected resources on the current authorization information collected at run time in response to a given request.

Still another aspect of the invention comprises an authorization information management process comprising storing in a central repository dynamically variable role data defining generic roles that can be associated with multiple users, along with responsibility data in the same manner, if applicable. In this process privileges are associated with the roles or responsibilities based on their current respective definitions. When queried by an external application, the current variable value of the privilege status, with respect to a given protected resource or type of resource, associated with the currently defined role, and responsibility, if applicable, assigned to a user, is made available at run-time to the respective external application requesting access authorization for a user who seeks access to said protected resource via said application. In the preferred system, the central repository runs on and is maintained by the same system that hosts the user management system or directory, such as the human resources, customer relationship management or project planning system.

Advantages

The data model, which is object of the invention, proposes a novel organization of the privileges held by system users, thus simplifying the maintenance of authorizations. Under the premise that the privileges of a user are bundled in roles, the purpose of the data model is to ease the role management by dramatically reducing the number of roles necessary in a system. The present invention will enable user management to evolve from proprietary, application-specific solutions that contain only high-level role information to central generic authorization repositories that offer not only role data, but also detailed, ready-to-use authorization information. Applications will be able to use information supplied by the central user repositories without additional processing or checking, eliminating the need for sophisticated user management functions within individual business applications, thus relieving the administrator from maintaining the access rights with every participating system. The needed authorization information is managed, maintained by and kept at the appropriate system that hosts the user base, e.g., human resources.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Introduction

Maintaining separate roles for each distinct position within the organization results in a proliferation of specific roles, which often differ only by virtue of the individual's location geographically or within the organization chart. For example, the positions of sales manager for Brazil and sales manager for Portugal would typically differ critically not in function but in the geographical territory of responsibility, cost center, reporting lines, etc.

The data model of the present invention relies on the separation between roles in the functional sense and responsibilities. In other words, the actions that the user is allowed to make, in terms of access to services or processing steps, are distinguished in the data model from the resources, usually, data, on which these actions are performed. As a consequence, different responsibilities of users having the same function do not require different roles to be maintained in the system. Conversely, the area of responsibility may be the same but different users within the same area can have different functional roles. In the end, the privileges of a given user are defined by the combination of both parts, the functional roles and the areas of responsibilities.

The data model which is object of the invention takes advantage of this new way of looking at roles by taking into account the divisibility and fungibilty of roles and responsibilities and using this logic to create a novel organization of the privileges held by system users, thus simplifying the maintenance of authorizations. Under the premise that the privileges of a user are bundled in roles, the purpose of the data model is to ease the role management by dramatically reducing the number of roles necessary in a system.

Instead of treating roles as a flat enumeration, the invention is based upon a quadratic model, i.e., one in which each position within the enterprise is defined as the product of two types of variables: (1) a generic role (which may be comprised of a unique set of sub roles) and (2) a specific set of responsibilities to go with the roles.

Conventional roles, i.e., "specific roles," more in the nature of position descriptions, can be separated from their associated responsibilities and thus factored into generic roles and subroles on the one hand and responsibilities and sub-responsibilities on the other hand. Generic roles can be redefined to represent exclusively the functions of the individual's position reflected in the actions he or she is allowed to perform without consideration of the objects upon which those actions are executed. The functions at the atomic level can be aggregated to form generic roles associated commonly with similar positions among the company's staff. So all the functions associated with a basic sales position would be assigned to a generic sales role. Separately, the responsibilities consist of the objects upon which the actions are executed, e.g., data that an action modifies. For sales roles, the corresponding set of responsibility parameters would include, e.g., responsibility for a particular sales territory, or range of products, or customers within a certain size range, business or other category, etc. Taken alone, these generic roles and responsibilities are an incomplete description. But together the intersection of a generic role and a specific set of responsibilities fully specifies the individual's position, or conventionally, his specific role in the organization.

This approach imparts object-oriented programming principles to role administration in the sense that the generic roles or responsibilities are treated as objects that have predefined characteristics and inheritance properties. Thus when new positions are added in the company the same modular objects (i.e., generic roles) can be re-used in most cases without generating new roles.

Solution: Authorization Data Model

The subject of the invention is a way of modeling authorization information that dramatically reduces the number of roles, which need to be maintained in a role-based system. The core idea is to separate the role, reflecting the position of an individual in an organization, from the responsibilities, reflecting the areas of activity, which need to be accessed by this individual.

The simplest reflection upon the system is that the information about the actions an individual is allowed to take are separated from the information qualifying the data upon which these actions are taken.

Figure 1:
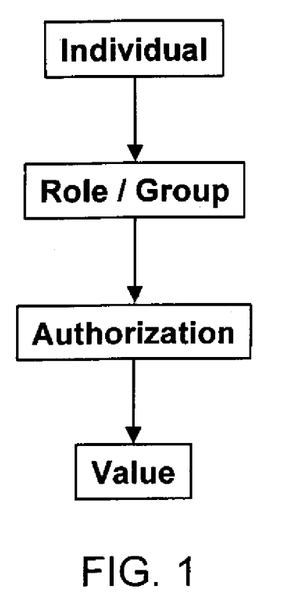
FIG. 1 is a flow chart illustrating the basic structure for authorization management, according to the invention.

The general structure of existing authorization management systems is composed of individuals, roles, profiles or groups that qualify these individuals and authorizations/privileges that belong to the individual. FIG. 1 shows diagrammatically the basic design of the typical authorization management system. In this system the individual who is being checked for authorization to access a protected resource is presented as a query to a database maintained by the application, which, using the individual's role within a group and its associated privileges, decides on the basis of the fixed role and privilege information whether a particular action is authorized or not. The result of this determination is the value, for example yes or no, reflecting whether access is or is not granted, or conditionally granted in some cases.

Figure 2:
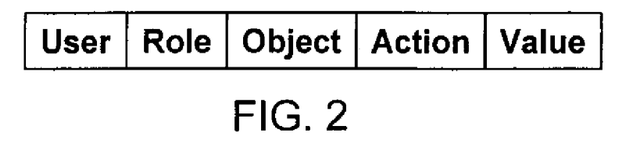
FIG. 2 is a data model for authorization management data.

This leads to the implementation of the data model in a typical relational database as shown in FIG. 2. The fields consist of user, role, object, action and value. The user field contains the user ID of the individual. The role field contains the specific position information, to the object field identifies the data for which access is being evaluated and the value field is the authorization status, i.e., access granted or not granted. The data model of FIG. 2 is not only static or fixed, but it is replicated in multiple applications and user authorization tools.

Performing the same actions, or having the same access rights for different objects, results in different authorizations. In order to differentiate, one will need to create different roles to reflect those changes. Imagine the simple example of one company giving the sales people the right to access the product sales information in their own area. For each and every area, there will be another sales role created for that company.

With the model proposed by this invention, the fields are not static anymore, but include generic variables. The input for filling the fields is requested at run-time from an external system containing information about the user, and/or the fields of the record that are already filled at the time of the enquiry.

This can be for example realized through a backtracking link as shown in the figure. The static authorizations composed of the elements object, action and value are replaced by authorizations composed mainly of wildcards for the elements action and value. The object will be given at runtime by the application proving the access rights.

The system relies on decomposition or factoring of positions into two basic components: roles and responsibilities.

Objects are "protected resources" and could be data or a transaction or instantiation of a class, etc. In the context of authorization, an "object" is a protected resource that the user wishes to access in some way. The "action" is the requested manner and extent of access that the user seeks with respect to the object. So if the object is data in a database, the action could be read, write, edit, move, or delete. If the object was a particular screen, the action could be display. If the object was a transaction, the action could be approve, reject, comment, review, complete, and so on.

Figure 3:
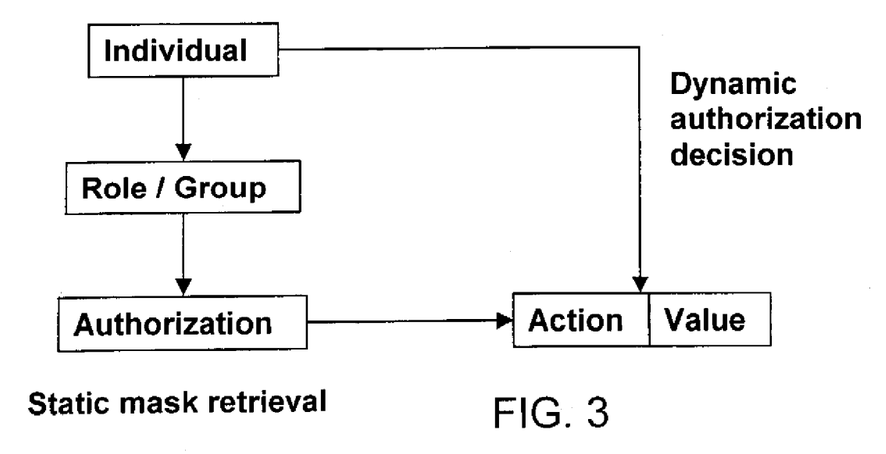
FIG. 3 is a flow chart illustrating a process for completion of authorization at runtime.
Figure 4:
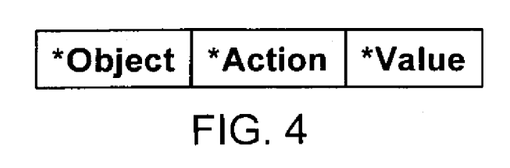
FIG. 4 is a wild-card based authorization data model.

FIG. 3 is shows a system that partakes of both the prior and the new system. As in the prior system, the user ID would be paired with permissions through a static mask retrieval process, as shown in FIGS. 3 and 4. So knowing the ID and the object and action to be applied to the object, the same database could be queried for a yes/no value for a given action. This information is static in the authorization database. If the action/value fields have not been filled in already by the static system, a need updating, the new system triggers a look up of the meaning and implications of the individual's roles and responsibilities in an external system. This dynamic authorization decision triggers a call to a different database where the rights and privileges associated with these roles and responsibilities are stored. So the privileges associated with roles and responsibilities are disassociated from the individual per se. Rather they are associated with generic roles and responsibilities that may be changed and supplemented and updated from time to time without reference to or even knowledge of a particular individual. The difference between these two systems is that in the static, fixed data model, the fields are fixed, and in the dynamic system, they are completed at run time.

Figure 5:
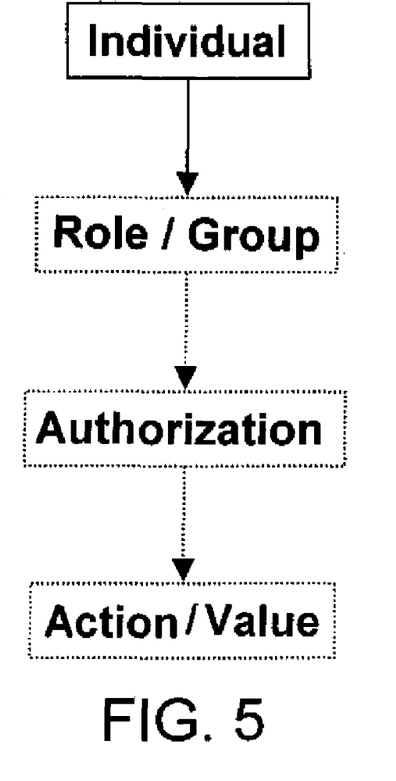
FIG. 5 is the flow chart of FIG. 1 shaded to show the portion that is replaced by the wild card based model of the invention.
Figure 6:
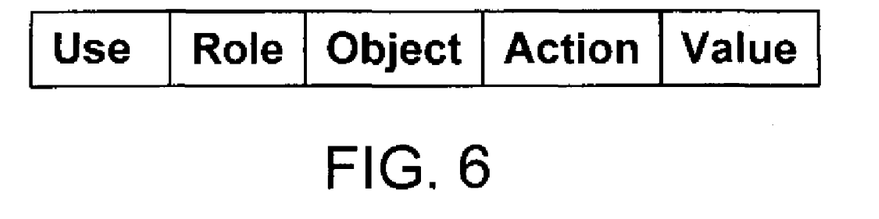
FIG. 6 is the data model of FIG. 2 associated with the flow chart of FIG. 5.

FIGS. 5 and 6 merely show conceptually the portion of the prior system that is addressed and replaced by the new approach. The grayed blocks containing static information on role/group, authorization and value are basically replaced by the wild card model.

Figure 7:
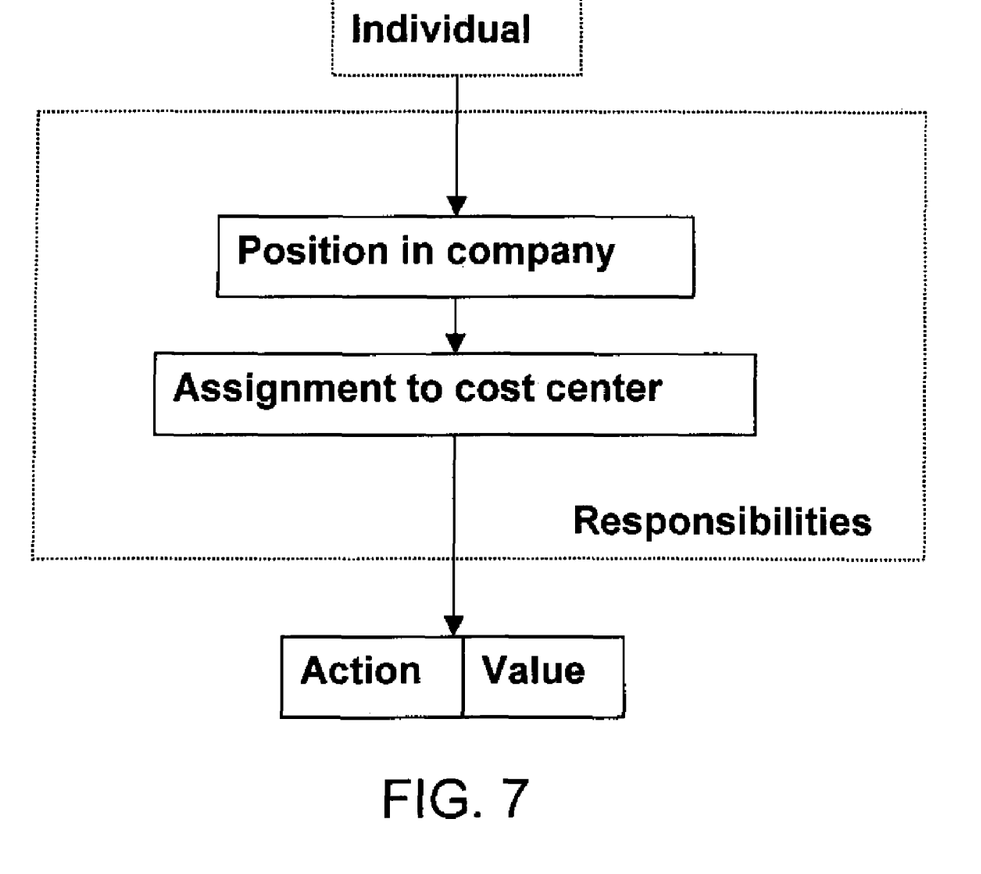
FIG. 7 is a flow chart illustrating in more detail the process for completion of authorization at runtime.
Figure 8:
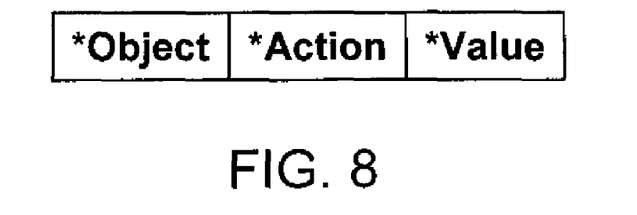
FIG. 8 is the wild-card based authorization data model of FIG. 4 associated with the flow chart of FIG. 7.

One example of this dynamic authorization decision process is shown in FIGS. 7 and 8. Here the dynamic decision process of FIG. 3 is implemented by way of a query or call to an external database which holds the responsibilities and associated permissions for various positions and cost centers in a company, Based on the content of the external database, at run time, which may be different from time to time, the action/value fields are filled dynamically resulting in the authorization.

Figure 9:
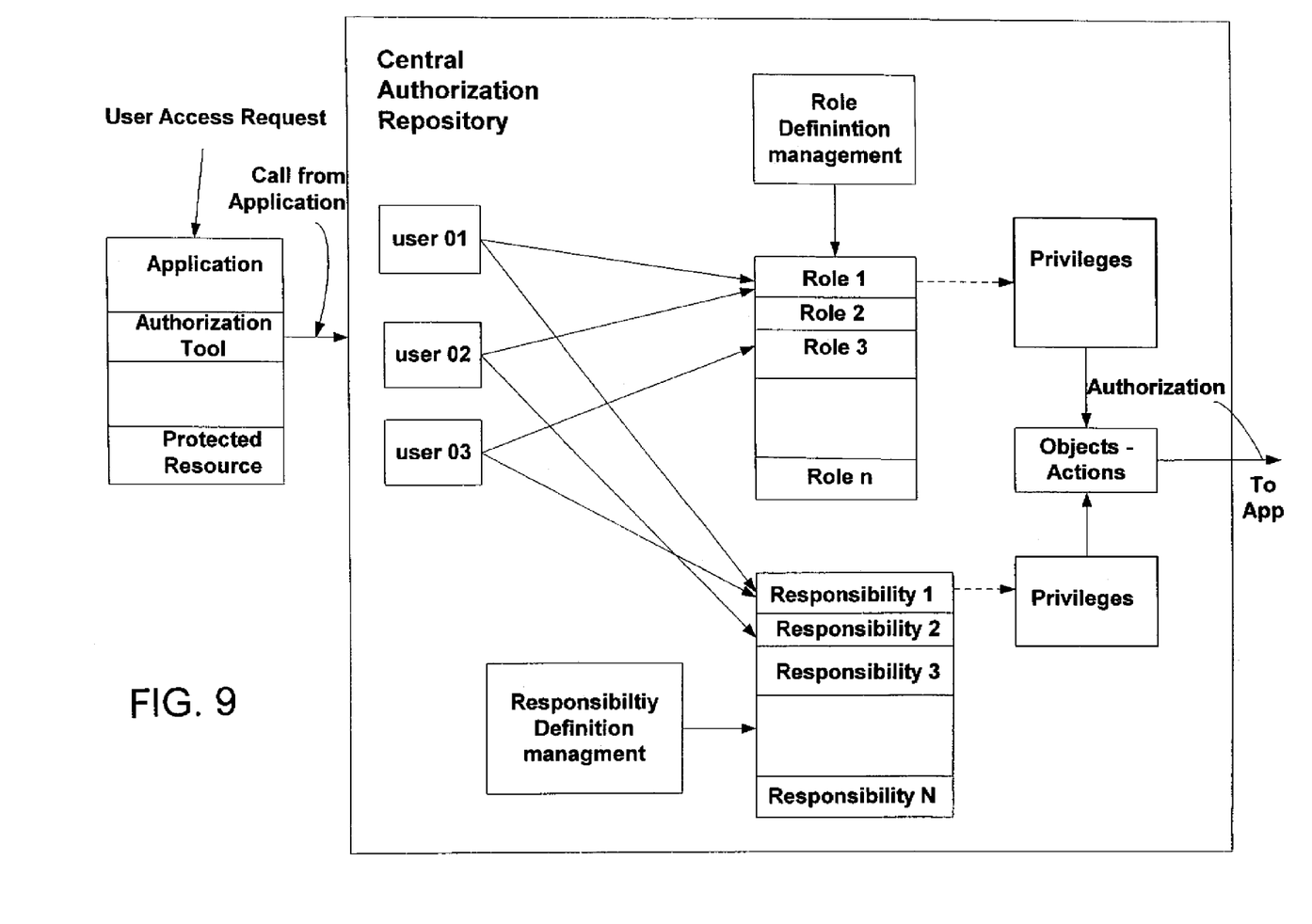
FIG. 9 is a block diagram of a dynamic authorization system using a centralized authorization repository.

Another visualization of this concept is provided in FIG. 9, showing interaction between one or more applications with a central authorization repository. Here an application with access to a protected resource, e.g., data or a transaction, receives a user request for access to the protected resource. The application contains an authorization module or tool that generates, in response to the access request, an inquiry to a central authorization repository maintained for example by the system that hosts the user information database within the enterprise, e.g., human resources, project planning, or CRM (customer relationship manager) for customer links. This repository, which may be a data storage system implemented in the form of a relational database, contains a plurality of role definitions, in the form indicated as role No. 1, role No. 2, etc. These roles are not uniquely associated with a particular individual but are available for assignment to any individual. So for example, in FIG. 9, users 1 and 2 are assigned the same role 1, e.g., sales manager, but have different respective responsibilities 1 and 2, e.g., Argentina and Brazil. Similarly users 1 and 3 have different roles, e.g., sales manager and technical writer, but the same areas of responsibility, e.g., Argentina.

The meaning or definition and associated privileges are defined by a role definition management system, through which the description and functions of the roles can be manipulated and redefined from time to time, independent of the identity of the individual having those roles and independent of changes in personnel. In addition, the repository might contain a plurality of responsibility descriptions, corresponding, e.g., to territories, cost centers, groups, etc. As with the roles, the responsibility descriptions are tended by a responsibility definition management system, which operates independently of the identity of the individual users, through which the responsibilities can be enlarged, contracted, supplemented or redefined from time to time.

The group of roles and responsibility definitions have associated with them a plurality of privileges that govern access to protected resources, or objects. In FIG. 9 the privileges are shown conceptually as being separately grouped for roles and for responsibilities, respectively, but they can be the same or the responsibilities privileges can in effect filter or mask the privileges associated with various roles. The privileges are implied, imputed or discretely assigned to the roles and responsibilities.

At the time of a user access request, assuming the users ID is in the repository, the system will find the corresponding privileges, existing at run time, for the generic roles and responsibilities as they are defined at run time, to which the user's ID is linked in the database. Then the systems will apply the privileges to the object for which access is sought, resulting in a value corresponding to granted or withheld or some other logical condition with respect to the processing of the user's approved access to the protected resource.

Because the role and responsibility data is not fixed but is dynamically variable, the action/value data is are wild cards for any object. They are not fixed. Authorization may be available one day or moment but not the next.

While FIG. 9 shows but one application, this one application is intended to represent any number of multiple independent applications with access to the same central authorization repository.

A number of embodiments of the invention have been described. Nevertheless, it will be understood that various modifications may be made without departing from the spirit and scope of the invention. For example, the use of a true relational database is not required. Accordingly, other embodiments are within the scope of the following claims.

What is claimed is:

1. A multiple application authorization process, comprising:

receiving requests for authorization at a plurality of applications at run-time from users seeking access to protected resources, independently collecting, at the applications, respective authorization information at run-time from a central repository containing user information, the user information including dynamically variable role data defining generic roles in an organization and to which a user can be assigned, more than one user being assignable to a given generic role in the organization, the user information associating privileges with said generic roles in the organization based on their current respective definitions, and granting access to protected resources based on the authorization information collected at run-time in response to a given request;

wherein the central repository contains dynamically variable responsibility data defining generic responsibilities that can be associated with multiple users;

wherein the generic roles in the organization can be varied independently of the generic responsibilities and user associations with the generic roles in the organization;

wherein the generic responsibilities can be varied independently of the generic roles in the organization and user associations with the generic responsibilities;

wherein the receiving requests for authorization at a plurality of applications at run-time from users seeking access to protected resources comprises:

receiving a request from one of the users seeking access to an object that is one of the protected resources, the one of the users being assigned to one of the generic roles and one of the generic responsibilities, the one of the generic roles being associated with privileges, the one of the generic responsibilities being associated with privileges; and wherein the granting access to protected resources based on the authorization information collected at run-time in response to a given request comprises:

granting access to the protected resource based on the privileges associated with the one of the generic roles, the privileges associated with the one of the generic responsibilities and the object to which the one of the users seeks access.

2. The multiple application authorization process of claim 1, wherein the step of granting access comprises dynamically deciding whether a user is authorized to access a given protected resource based on the current variable role data, rather than the user's identity, collected at run-time from the central repository.

3. The authorization process of claim 1, wherein the one of the generic roles is a first one of the generic roles and wherein the one of the generic responsibilities is a first one of the generic responsibilities;

wherein a second one of users is assigned to the first one of the generic roles and a second one of the generic responsibilities; and wherein a third one of the users is assigned to a second one of the generic roles and the first one of the generic responsibilities.

4. The authorization process of claim 1, further comprising:

altering said dynamically variable role data from time to time to change a definition of a given role independently of user associations; and making a current variable value of a privilege status, with respect to a given protected resource, associated with a currently defined role assigned to a user, available at run-time to one of the plurality of applications receiving the requests for authorization at run-time from users seeking access to protected resources.

5. The multiple application authorization process of claim 2, wherein the collecting information step comprises querying a central data repository external to the application from which the user requests authorization.

6. The multiple application authorization process of claim 2, further comprising altering role data to cause the privileges associated with a given role to change.

7. The multiple application authorization process of claim 6, wherein the step of altering said role data for a given generic role is carried out independently of the responsibilities of users associated with a given generic role.

8. The multiple application authorization process of claim 6, wherein the information collected from said repository including the current variable value of the privilege status with respect to the protected resource associated with a combination of the currently-defined generic role or roles and responsibilities assigned to the user requesting access.

9. The authorization process of claim 8, wherein the step of altering said responsibility data for a given responsibility is carried out independently of the roles of users associated with the given generic responsibility.

10. The authorization process of claim 8, wherein users are assigned to roles and responsibilities by decomposing a given user's positional functions and responsibilities into basic actions and objects to which the actions are applied, mapping the actions and objects onto respective generic roles and responsibilities stored in said repository, and assigning the respective roles and responsibilities to the user.

11. A system comprising:

a plurality of applications receiving requests for authorization at run-time from users seeking access to protected resources; and a central repository storing user information including dynamically variable role data defining generic roles in an organization and to which a user can be assigned, more than one user being assignable to a given generic role in the organization, the user information associating privileges with said generic roles in the organization based on their current respective definitions;

the plurality of applications to independently collect respective authorization information at run-time from the central repository and to grant access to protected resources based on the authorization information collected at run-time;

wherein the central repository contains dynamically variable responsibility data defining generic responsibilities that can be associated with multiple users;

wherein the generic roles in the organization can be varied independently of the generic responsibilities and user associations with the generic roles in the organization;

wherein the generic responsibilities can be varied independently of the generic roles in the organization and user associations with the generic responsibilities;

wherein the receiving requests for authorization at a plurality of applications at run-time from users seeking access to protected resources comprises:

receiving a request from one of the users seeking access to an object that is one of the protected resources, the one of the users being assigned to one of the generic roles and one of the generic responsibilities, the one of the generic roles being associated with privileges, the one of the generic responsibilities being associated with privileges; and wherein to grant access to protected resources based on the authorization information collected at run-time in response to a given request comprises:

to grant access to the protected resource based on the privileges associated with the one of the generic roles, the privileges associated with the one of the generic responsibilities and the object to which the one of the users seeks access.

* * * * *